(12) United States Patent (10) Patent No.: US 8,531,748 B2
Szarvas et al. (45) Date of Patent: Sep. 10, 2013

(54) LENS SYSTEM FOR COMMON APERTURE HOLOGRAPHIC STORAGE SYSTEM

(75) Inventors: Gabor Szarvas, Budapest (HU); Laszlo Domjan, Budapest (HU)

(73) Assignee: Thomson Licensing (FR)

( * ) Notice: Subject to any disclaimer, the term of this patent is extended or adjusted under 35 U.S.C. 154(b) by 592 days.

(21) Appl. No.: 12/284,663

(22) Filed: Sep. 24, 2008

(65) Prior Publication Data

US 2009/0097086 A1    Apr. 16, 2009

(30) Foreign Application Priority Data

Oct. 11, 2007    (EP) .................................... 07118331

(51) Int. Cl.
*G02H 1/16*    (2006.01)

(52) U.S. Cl.
USPC ........................................................... 359/29

(58) Field of Classification Search
USPC ........................................................... 359/29
See application file for complete search history.

(56) References Cited

U.S. PATENT DOCUMENTS

| | | | | |
|---|---|---|---|---|
| 3,695,744 A * | 10/1972 | Clay | ................................ | 359/24 |
| 3,754,808 A * | 8/1973 | Clay et al. | ........................ | 359/33 |
| 4,325,601 A * | 4/1982 | Funato | ............................. | 359/17 |
| 5,671,073 A * | 9/1997 | Psaltis et al. | ..................... | 359/22 |
| 6,108,110 A * | 8/2000 | Orlov et al. | ...................... | 359/22 |
| 2005/0018180 A1 | 1/2005 | Ayres | | |
| 2006/0050544 A1 | 3/2006 | Horimai | | |
| 2006/0262369 A1 | 11/2006 | Zeng et al. | | |
| 2007/0013985 A1 * | 1/2007 | Chuang et al. | .................. | 359/22 |
| 2007/0140091 A1 | 6/2007 | Liu et al. | | |
| 2007/0153344 A1 | 7/2007 | Liu et al. | | |

FOREIGN PATENT DOCUMENTS

| | | |
|---|---|---|
| JP | 2006251494 | 9/2006 |
| WO | WO9957719 | 11/1999 |
| WO | WO03/032300 | 4/2003 |
| WO | WO2004/102541 | 11/2004 |
| WO | WO2006/003077 | 1/2006 |

OTHER PUBLICATIONS

EPO Patent Abstract of Japan Pub. No. 200601494, Sep. 21, 2006, Konica Minolta Optic, Inc.
European Search Report dated Dec. 20, 2007.
D.R. Neal et al., "Use of beam parameters in optical component testing", Optical Manufacturing and Testing, Proceedings of the SPIE vol. 4451, pp. 394-405 (2001).

* cited by examiner

*Primary Examiner* — Jennifer L. Doak
(74) *Attorney, Agent, or Firm* — Jack Schwartz and Associates, PLLC (57) ABSTRACT

The present invention relates to a lens system for an apparatus for reading from and/or writing to holographic storage media, and more specifically to a lens system optimized for an apparatus with a coaxial common aperture arrangement of an object beam and a reference beam. According to the invention, the lens system, which Fourier transforms an object beam and focuses a reference beam into a hologram layer of a holographic storage medium, and which focuses a servo beam onto a servo area of the hologram layer, includes a moving part acting on the object beam, the reference beam and the servo beam, and a fixed part acting only on the servo beam.

8 Claims, 5 Drawing Sheets

LENS SYSTEM FOR COMMON APERTURE HOLOGRAPHIC STORAGE SYSTEM

This application claims the benefit, under 35 U.S.C. §119 of European Patent Application 07118331.3, filed Oct. 11, 2007.

FIELD OF THE INVENTION

The present invention relates to a lens system for an apparatus for reading from and/or writing to holographic storage media, and more specifically to a lens system optimized for an apparatus with a coaxial common aperture arrangement of an object beam and a reference beam. The invention further relates to an apparatus for reading from and/or writing to holographic storage media using such a lens system.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a single or few 2-dimesional layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

In coaxial holographic data storage the object beam and one or more reference beams run along a common optical axis. For example, WO 2006/003077 discloses a Fourier holographic storage system with a coaxial optical head for a reflection-type holographic recording medium. The optical head uses multiplexing methods with a spherical reference beam in coaxial arrangement. This requires a high quality spherical beam as the reference beam at the Fourier plane of the object beam. As a consequence, the same Fourier objective must be optimized both for the implementation of a high quality spherical beam, and for obtaining a good Fourier transformation. These are two contrary requirements.

The object of the Fourier objective consists of an array of pixels. This array is located at a finite distance from the objective. In the storage system, the corresponding beam is the information beam, the whole data channel is the information channel. In the reference channel, the object of the focusing lens is a single point, which is at an infinite distance from the Fourier objective. In the reference channel the Fourier objective acts as a simple focusing objective, where the focusing point of the reference beam is shifted from the optical axis.

In the Fourier plane, the object beam, which is the Fourier transform of the array of pixels, is an aggregation of the "aperture limited" plane waves. The reference beam is an axially shifted spherical beam at this plane. The shifted axis of the reference beam cone is orthogonal to the Fourier plane. Therefore, the behavior of the reference beam and the information beam is different at both planes, i.e. the object plane and the Fourier plane.

In EP 1 324 322 a servo system for holographic storage is proposed. This servo system is similar to the well-know servo system used for CD or DVD systems. The servo system operates with a wavelength that is different from the wavelength of the information beam. Usually, the servo system uses red light, whereas the information beam is blue or green. Consequently, the Fourier objective needs to be designed for two wavelengths. A well-known method for correcting the chromatic aberration of an objective used for white light or different laser wavelengths is to apply cemented doublets with different Abbe numbers. Another solution is to use a series of singlets with different Abbe numbers. However, because of the relatively large number of elements, the mass of the resulting color corrected Fourier objective is large for both solutions. This means that mechanically robust servos are required.

SUMMARY OF THE INVENTION

It is an object of the invention to propose a lens system suitable for use in a coaxial holographic storage system.

According to the invention, this object is achieved by a lens system for a coaxial holographic storage system, which Fourier transforms an object beam and focuses a reference beam into a hologram layer of a holographic storage medium, and which focuses a servo beam onto a servo area of the hologram layer, which includes a moving part which Fourier transforms the object beam and which focuses the reference beam and the servo beam, and a fixed part which pre-focuses only the servo beam. The lens system is a three-channel Fourier objective. The three channels are the information channel, the reference channel, and the servo channel, respectively. For optimizing the Fourier objective three configurations are used, namely the configuration of the information channel, the configuration of the reference channel, and the configuration of the servo channel. The three configurations have different object- and image distances, starting beam parameters, and weighted optimization criteria. Preferably, the moving part of the lens system has three lenses. Using three lenses allows to optimize the three configurations in parallel. The optimization criteria of the different configurations are more or less contradicting.

Preferably, at least two of the three lenses are aspheres, whereas the third lens is either a spherical lens or also an asphere. Using aspheric glass elements with an optimized shape, a trade-off between the contradicting requirements can be obtained.

Advantageously, the fixed part of the lens system is a lens that is acting solely on the servo beam. This lens preferably is a focusing lens with a long focal length. Because of the slightly different refractive indices of the material of the three lenses for the different wavelengths of the servo beam and the reference and object beam, without correction of the chromatic aberration the focal length of the lens system is generally longer for the servo beam than for the reference and object beam. For correcting this aberration the servo beam is slightly focused before its incidence on the three lenses of the lens system The servo channel is divided into two parts. One part moves together with the servo system, whereas the other one is fixed. The moving part of the servo channel is common with the information channel and the reference channel. The mass of the moving part of the three-channel objective is comparably low. The fixed part consists of the long focal length lens. The long focal length lens slightly focuses the light beam of the servo channel. One important problem to be solved by the three-channel objective are the different focal lengths of the Fourier objective for the different laser wavelengths. The aberration caused the different wavelengths is corrected by slightly focusing the servo light beam before its incidence on the Fourier objective using a pre-focusing lens. In this case, the two laser wavelengths are focused to the same place by means of three or four lenses, which are made from properly chosen materials with different Abbe numbers. Due to the pre-focusing the moving range of the focus servo system is limited to ±0.1 mm to ±0.2 mm.

Preferably, the fixed part further has a wavelength selective beam splitter, e.g. a dichroic prism. The wavelength selective beam splitter is used for coupling the servo light beam in and out of the path of the light beams used for holographic storage, i.e. for combining and separating the servo channel and the information/reference channels.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
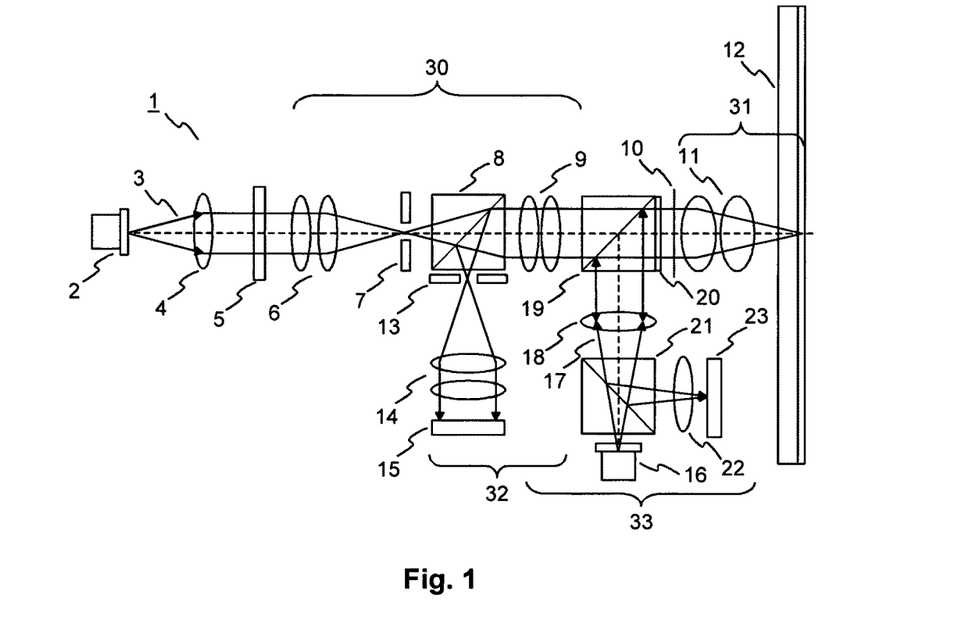
FIG. 1 schematically shows a 12f reflection type holographic storage system.

FIG. 1 schematically shows a known 12f reflection type holographic storage system. A laser diode 2 emits a light beam 3, which is collimated by a collimating lens 4. A spatial light modulator 5 imprints a data pattern onto the light beam 3, which is then imaged into an intermediate image plane 10 by a first Fourier objective pair 30, the so-called writing long focal length relay objective 30. For simplicity, the reference beam is not shown in this figure. The first Fourier objective pair 30 includes a Fourier objective 6, an inverse Fourier objective 9, and a Fourier filter 7 located in the Fourier plane of the first Fourier objective pair 30. A high NA Fourier objective 11 images the light beam 3 into a holographic storage medium 12. In combination with a reflective layer (not illustrated) of the holographic storage medium 12 the high NA Fourier objective 11 constitutes a folded second Fourier objective pair 31. For reading a third Fourier objective pair 32 is used, the so-called reading long focal length relay objective 32. The third Fourier objective pair 32 includes the inverse Fourier objective 9, a Fourier objective 14 and a Fourier filter 13 located in the Fourier plane of the third Fourier objective pair 32. A quarter wave plate 20 in combination with a polarization sensitive beam splitter 8 is used for separating the writing and reading beams. An array detector 15 detects the data contained in the reading beam. Further provided are CD/DVD type focus and track servo optics 33 for obtaining the necessary servo signals. A servo light source 16 generates a servo beam 17, which is collimated by a collimating lens 18 and coupled into the path of the light beam 3 by a wavelength selective beam splitter 19, in this case a dichroic prism. A further polarization sensitive beam splitter 21 directs a servo beam reflected from the holographic storage medium 12 via a focusing lens 22 onto a detector 23.

The above described optical arrangement is a 12f system, which consists of three 4f Fourier transforming/retransforming subsystems 30, 31, 32. Located in the system is an intermediate object and image plane 10. For reducing the system size and simplifying the servo system, the optical arrangement of FIG. 1 is a reflection type system. This means that the entire optical system is located at one side of the holographic storage medium 12. Of course, it is likewise possible to realize the system as a transmission type system.

In the following two embodiments according to the invention of the second 4f Fourier transforming subsystem 31 are discussed. In both embodiments the objective 11 has three lenses.

In the first embodiment, which is illustrated in FIGS. 2 to 6, the objective 11 contains one spherical lens 102 arranged between two aspheres 101, 103.

Figure 2:
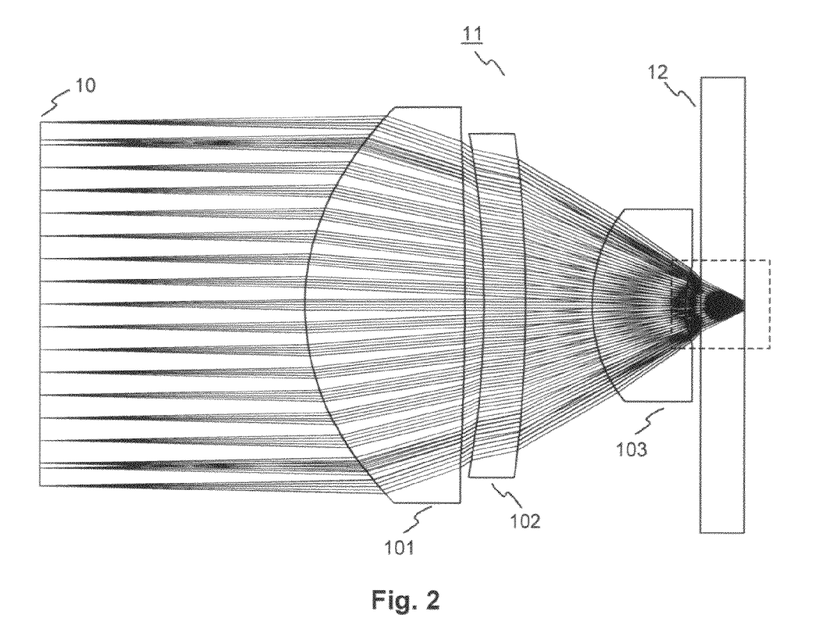
FIG. 2 depicts the information channel of a three-channel objective according to a first embodiment of the invention.
Figure 3:
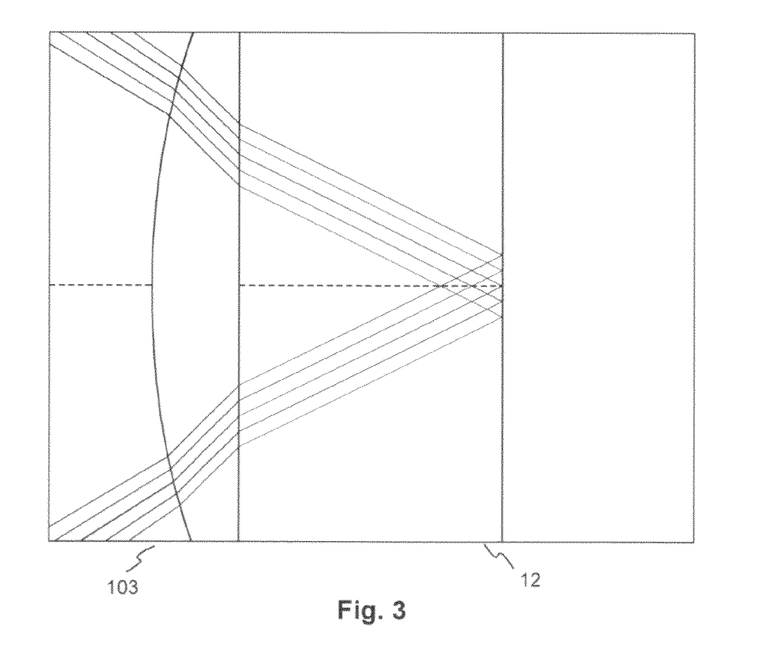
FIG. 3 shows an enlarged view of the information channel of FIG. 2.

FIG. 2 depicts the information channel of the three-channel objective 11. An enlarged view of the area indicated by the dashed rectangle is shown in FIG. 3. The information channel consists of two identical three-channel objectives 11, each comprising three lenses 101, 102, 103. The first objective 11 performs the Fourier transformation of the object into its back focal plane. The second objective 11 retransforms the image into the focal plane of the second objective. For the reflection type system, the three-channel objective 11 is used twice and functions as the first objective as well as the second objective. In its function as the first objective 11 it transforms the object onto the mirror surface of the holographic storage medium 12. The mirror reflects the light and in its function as the second objective 11 the three-channel objective 11 transforms the image back. The object plane of the information channel is the intermediate object plane 10 of the 12f system. This is the first focal plane of the first objective 11. The object of the Fourier objective 11 is an array of pixels, or an image of the array of pixels. The Fourier plane is the middle, common focal plane of the two identical objectives 11. Located near this Fourier plane is the storage material of the holographic storage medium 12. In the Fourier plane, the object beam, which is the Fourier transform of the array of pixels, is an aggregation of aperture limited plane waves. This can be seen more clearly in the enlarged view of the information channel illustrated in FIG. 3. The image plane is the intermediate image plane 10 of the 12f system. The information channel is a finite conjugate system. The information channel is telecentric at both object and image planes 10. This means that the entrance pupil and the exit pupil are in the infinity. See, for example, G. Erdei et al.: "*Telecentric/inverse-telecentric objective for optical data storage purposes*", Proc. SPIE Vol. 3573 (1998), p. 380-383.

Figure 4:
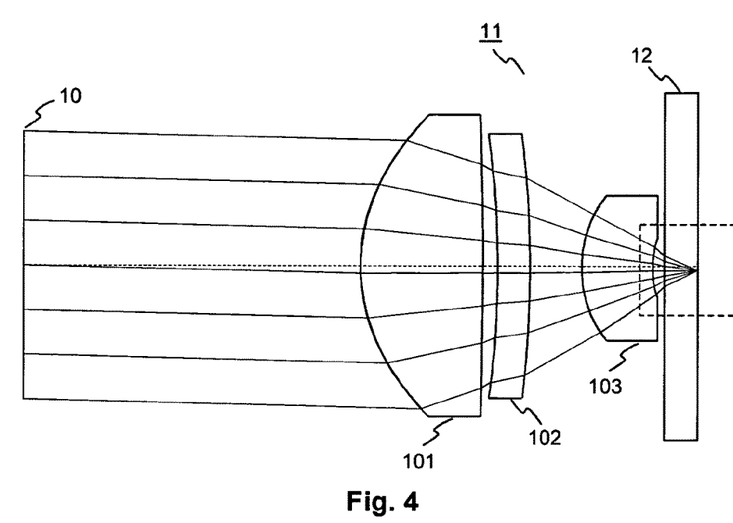
FIG. 4 depicts the reference channel of the three-channel objective according to the first embodiment.
Figure 5:
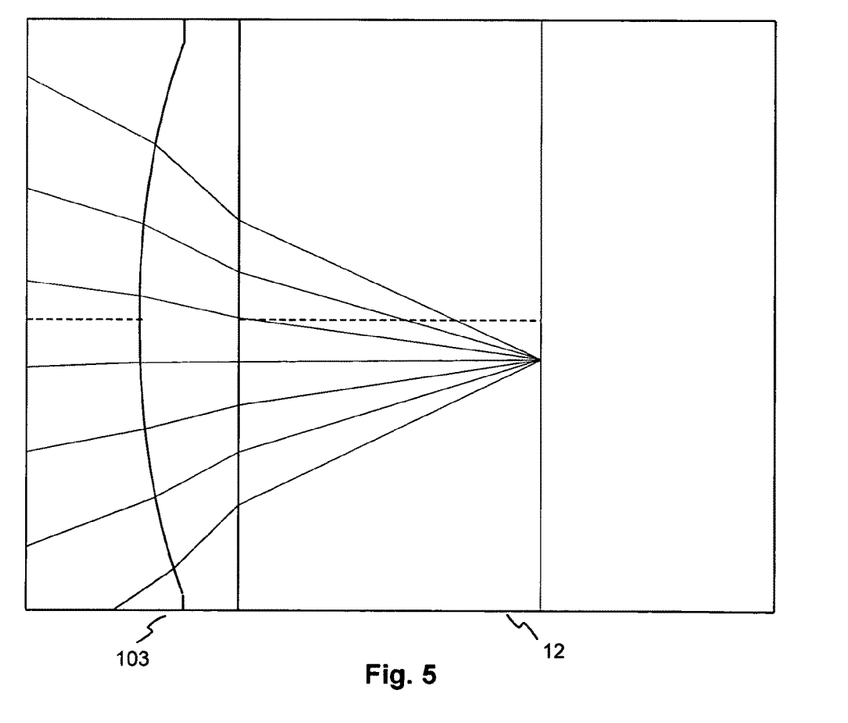
FIG. 5 shows an enlarged view of the reference channel of FIG. 4.

FIG. 4 depicts the reference channel of the three-channel objective 11 according to the first embodiment. An enlarged view of the area indicated by the dashed rectangle is shown in FIG. 5. The reference channel is an infinite conjugate system. It consists of only one objective 11 comprising the three lenses 101, 102, 103. The object of the objective is a single point, which is at infinite distance from the Fourier objective 11. The reference beam is an aperture limited plane wave before the objective 11. For simplicity, only a single reference beam is shown, whose direction of propagation is slightly inclined relative to the optical axis of the objective 11 to allow a separation of the reference beam channel and the object beam channel. The Fourier objective 11 acts as a simple focusing objective in this channel. Therefore, the reference beam is a spherical beam near the back focal plane, and a single point, or more precisely an Airy disk, at the back focal plane. This can be seen more clearly in the enlarged view of the reference channel illustrated in FIG. 5.

Figure 6:
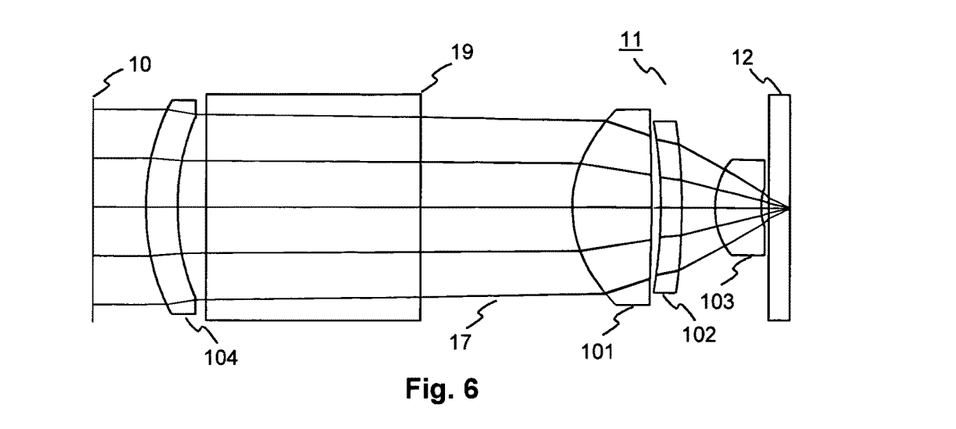
FIG. 6 depicts the servo channel of the three-channel objective according to the first embodiment.

FIG. 6 depicts the servo channel of the three-channel objective 11 according to the first embodiment. For simplicity, the servo channel is not angled in this figure. Theoretically, for the CD/DVD like servo system the servo beam 17 is a plane wave before the objective 11, and it is a spherical beam after the focusing objective 11, near the focal plane. The object distance is infinite. In the system of FIG. 1 two beams with different wavelengths are focused into the same plane, namely the reference beam and the servo beam 17. Because of the slightly different refractive indices of the material for the different wavelengths, without correction of the chromatic aberration the focal length of the objective 11 is generally longer for the servo beam 17 than for the reference beam. For correcting this aberration the servo beam 17 is slightly focused before its incidence on the focusing objective 11 by an additional lens 104. In this case the servo beam 17 and the reference beam can be focused into the same plane using two or three lenses, which are made from properly chosen materials with different Abbe numbers. In the figures only solutions using three lenses are shown. However, as for different Abbe numbers and refractive indices at least two lenses are necessary, a solution using only two lenses instead of the three lenses 101, 102, 103 is likewise feasible.

For reducing the moving mass of the three-channel objective 11 it is advantageously divided into a fixed part and a moving part. The moving part is common for all three channels, whereas the fixed part belongs only to the servo channel. The fixed part consists of the long focal length lens 104, which slightly focuses the servo beam 17 of the servo channel before its incidence on the objective 11. If the moving range of the focus servo system is limited, this pre-focusing does not cause any problem. In the present case the field of depth of the information channel limits the moving range of the focus servo system, because this is optimized for finite object distance. The field of depth of the information channel is about 0.05 mm to 0.2 mm. The pre-focused servo beam 17 of the servo channel has to work within the same range. Depicted in FIG. 6 is an additional dichroic prism 19 between the fixed part and the moving part, which couples the servo beam 17 into and out of the holographic channels (reference channel and information channel). Note that for simplicity in FIG. 6 the servo channel is not angled, contrary to the situation illustrated in FIG. 1.

Figure 7:
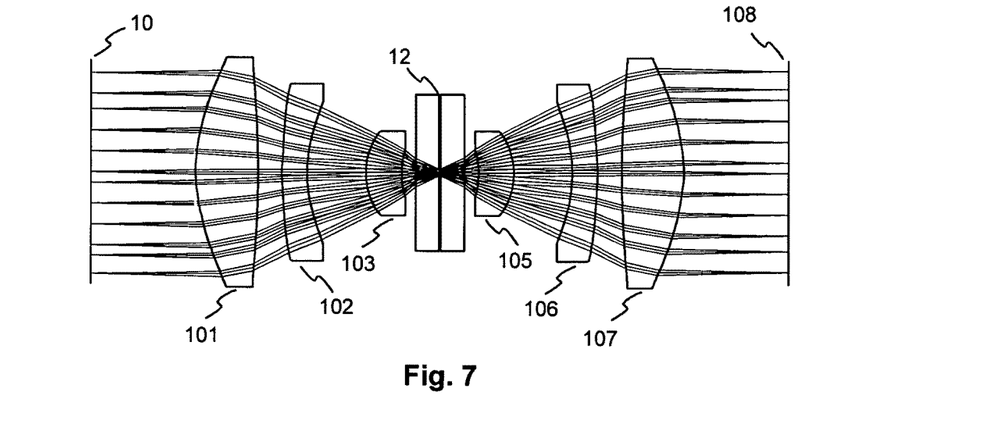
FIG. 7 depicts the information channel of a three-channel objective according to a second embodiment of the invention.
Figure 8:
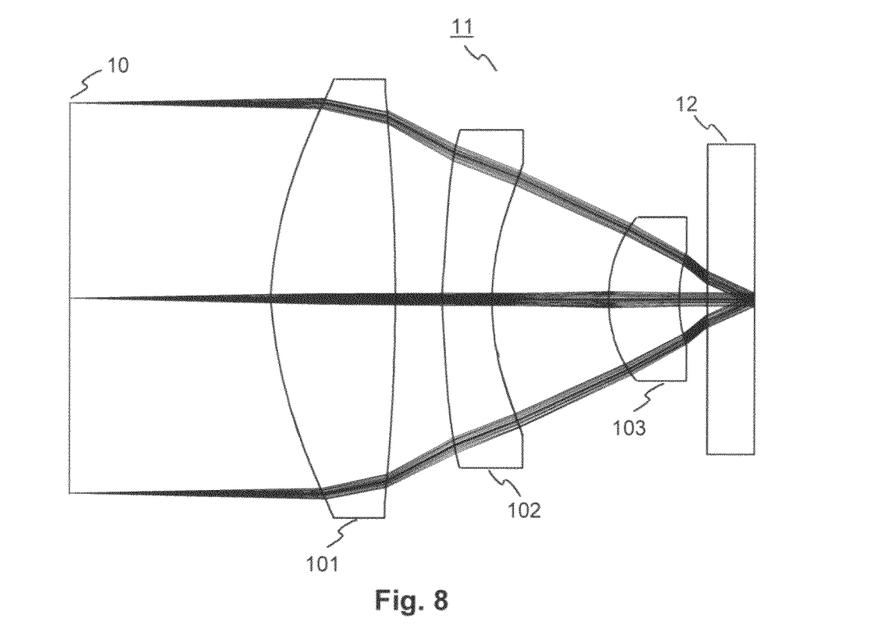
FIG. 8 depicts the reference channel of the three-channel objective according to the second embodiment.
Figure 9:
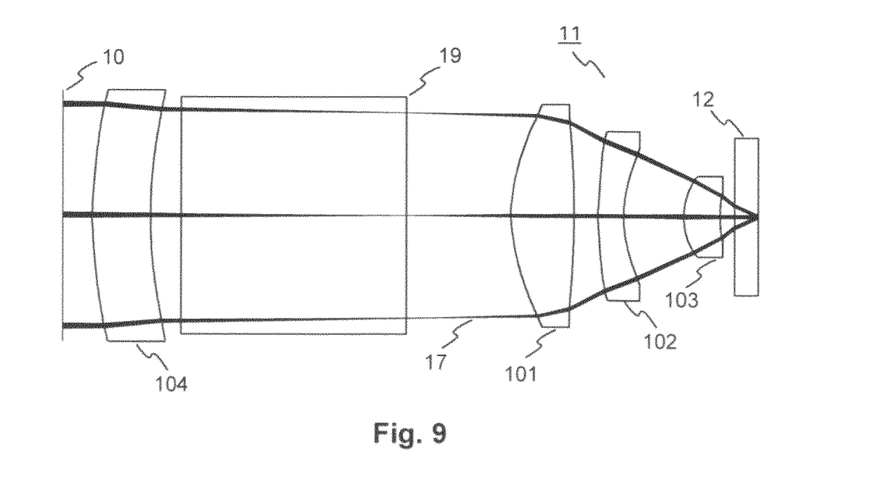
FIG. 9 shows the servo channel of the three-channel objective according to the second embodiment.

FIGS. 7 to 9 illustrate a second embodiment of the objective 11 for the case of a transmission type holographic storage system. In this embodiment the objective 11 contains three aspheric lenses 101, 102, 103. FIG. 7 shows the information channel, whereas FIGS. 8 and 9 depict the reference channel and the servo channel, respectively. As the information channel is optimized between the object and images planes, whereas the reference channel and the servo channel are only optimized until the Fourier plane, in FIG. 8 and FIG. 9 only the optical arrangement until the Fourier plane is shown.

For the optimization of the objective 11 three configurations are used, i.e. the configuration of the information channel, the configuration of the reference channel, and the configuration of the servo channel. All three configurations have different object and image distances, starting beam parameters, and they have their own weighted optimization criteria. The three configurations are optimized in parallel. The resulting lenses have to satisfy all three independent optimization criteria at the same time. In Table 1 the main different optimization parameters for the three configurations are summarized.

TABLE 1

|  | Object/image configuration | Reference configuration | Servo configuration |
| --- | --- | --- | --- |
| Wavelength | Blue or green | Blue or green | Red |
| Telecentric mode | Object/image space | No | No |
| Object distance | Finite | Infinite | Infinite |
| Field type | Object height | Object angle | Object angle |
| System aperture type | Object space numerical aperture | Entrance pupil diameter | Entrance pupil diameter |
| Wavefront shape near the Fourier plane | Plane | Spherical | Spherical |

From the table it can be seen that the optimization criteria of the different configurations are more or less contradicting. Using aspheric elements with an optimized shape, a trade-off between the contradicting requirements is obtained.

An exemplary lens prescription of the first embodiment of the three-channel objective 11 is given in Table 2.

TABLE 2

| Surf | Type | Radius | Thickness | Glass | Diameter | Conic |
| --- | --- | --- | --- | --- | --- | --- |
| 0 (OBJ) | STANDARD | Infinity | 5.260595 |  | 8 | 0 |
| 1 | STANDARD | Infinity | 0 |  | 9.019933 | 0 |
| 6 | STANDARD | Infinity | 0.8 |  | 9.019933 | 0 |
| 7 | EVENASPH | 5.092394 | 3.69 | C0550 | 8.68 | −0.473172 |
| 8 | EVENASPH | −56.2031 | 0.4529773 |  | 8 | 0 |
| 9 | STANDARD | −21.53568 | 0.9664192 | N-LASF41 | 7.6 | 0 |
| 10 | STANDARD | −27.66092 | 1.569578 |  | 7.6 | 0 |
| 11 | EVENASPH | 3.952589 | 2.177258 | N-LASF44 | 4.222626 | 0 |

TABLE 2-continued

| Surf | Type | Radius | Thickness | Glass | Diameter | Conic |
|---|---|---|---|---|---|---|
| 12 | EVENASPH | 3.635379 | 0.334634 | | 1.739822 | 0 |
| 13 | STANDARD | Infinity | 1 | POLYCARB | 10 | 0 |
| 14 | COORDBRK | — | 0 | | — | — |
| 15 (STO) | STANDARD | Infinity | 0 | MIRROR | 0.2241958 | 0 |
| 16 | COORDBRK | — | 0 | | — | — |
| 17 | STANDARD | Infinity | −1 | POLYCARB | 10 | 0 |
| 18 | STANDARD | Infinity | −0.334634 | | 10 | 0 |
| 19 | EVENASPH | 3.635379 | −2.177258 | N-LASF44 | 1.739822 | 0 |
| 20 | EVENASPH | 3.952589 | −1.569578 | | 4.222626 | 0 |
| 21 | STANDARD | −27.66092 | −0.9664192 | N-LASF41 | 7.6 | 0 |
| 22 | STANDARD | −21.53568 | −0.4529773 | | 7.6 | 0 |
| 23 | EVENASPH | −56.2031 | −3.69 | C0550 | 8 | 0 |
| 24 | EVENASPH | 5.092394 | −0.8 | | 8.68 | −0.473172 |
| 25 | STANDARD | Infinity | 0 | | 9.023327 | 0 |
| 26 | STANDARD | Infinity | −5.260595 | | 9.023327 | 0 |
| 27 (IMA) | STANDARD | Infinity | | | 8.000393 | 0 |

Rotationally symmetric polynomial aspheric surfaces are described by a polynomial expansion of the deviation from a spherical (or aspheric described by a conic) surface. The even asphere surface model uses only the even powers of the radial coordinate to describe the asphericity. The model uses the base radius of curvature R and the conic constant k. The surface sag is given by $$z(r) = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12},$$

with c=1/R.

The aspheric coefficients for the lens prescription of Table 2 are summarized in Table 3.

TABLE 3

| Surf | $\alpha_1$ | $\alpha_2$ | $\alpha_3$ | $\alpha_4$ | $\alpha_5$ | $\alpha_6$ |
|---|---|---|---|---|---|---|
| ... | | | | | | |
| 7 | 0 | 0 | −2.25726e−006 | 2.41164e−009 | −8.2628e−009 | 0 |
| 8 | 0 | 0.00051248 | −2.26611e−005 | 3.33115e−007 | 0 | 0 |
| ... | | | | | | |
| 11 | 0 | 0.0040396305 | 0.00020725675 | 0.00014763463 | −1.68831e−005 | 3.90073e−006 |
| 12 | 0 | 0.055957352 | −0.013745846 | 0.059574554 | | 0 |
| ... | | | | | | |
| 19 | 0 | 0.055957352 | −0.013745846 | 0.059574554 | | 0 |
| 20 | 0 | 0.0040396305 | 0.00020725675 | 0.00014763463 | −1.68831e−005 | 3.90073e−006 |
| ... | | | | | | |
| 23 | 0 | 0.00051248 | −2.26611e−005 | 0.00051248 | 0 | 0 |
| 24 | 0 | 0 | −2.25726e−006 | 2.41164e−009 | −8.2628e−009 | 0 |

An exemplary lens prescription of the second embodiment of the three-channel objective 11 is shown in Table 4.

TABLE 4

| Surf | Type | Radius | Thickness | Glass | Diameter | Conic |
|---|---|---|---|---|---|---|
| 0 (OBJ) | STANDARD | Infinity | 0 | | 7.8 | 0 |
| 1 | STANDARD | Infinity | 4.167991 | | 8.58 | 0 |
| 2 | EVENASPH | Infinity | 0 | | 8.754253 | 0 |
| 3 | EVENASPH | 5.780808 | 2.556379 | N-LASF44 | 8.802907 | 0 |
| 4 | EVENASPH | −31.54743 | 0.9487727 | | 8.338954 | 0 |
| 5 | EVENASPH | 18.86112 | 0.99707 | N-LAF34 | 6.811814 | 0 |
| 6 | EVENASPH | 3.432093 | 2.388544 | | 5.689421 | 0 |
| 7 | EVENASPH | 1.929596 | 1.441661 | N-LAF34 | 3.261422 | 0 |
| 8 | EVENASPH | 2.432828 | 0.5691814 | | 1.981073 | 0 |
| 9 | STANDARD | Infinity | 1 | ACRYLIC | 6 | 0 |
| 10 (STO) | STANDARD | Infinity | 1 | ACRYLIC | 0.2410211 | 0 |
| 11 | STANDARD | Infinity | 0.5691814 | | 6 | 0 |
| 12 | EVENASPH | −2.432828 | 1.441661 | N-LAF34 | 1.981073 | 0 |
| 13 | EVENASPH | −1.929596 | 2.388544 | | 3.261422 | 0 |
| 14 | EVENASPH | −3.432093 | 0.99707 | N-LAF34 | 5.689421 | 0 |
| 15 | EVENASPH | −18.86112 | 0.9487727 | | 6.811814 | 0 |
| 16 | EVENASPH | 31.54743 | 2.556379 | N-LASF44 | 8.338954 | 0 |
| 17 | EVENASPH | −5.780808 | 4.167991 | | 8.802907 | 0 |
| 18 (IMA) | STANDARD | Infinity | | | 7.810672 | 0 |

The aspheric coefficients for the lens prescription of Table 4 are summarized in Table 5.

TABLE 5

| Surf | $\alpha_1$ | $\alpha_2$ | $\alpha_3$ | $\alpha_4$ | $\alpha_5$ | $\alpha_6$ |
|---|---|---|---|---|---|---|
| ... | | | | | | |
| 3 | 0 | −0.001185155 | −3.8186753e−005 | 9.7252063e−007 | −4.5853774e−008 | 0 |
| 4 | 0 | −1.561566e−006 | 3.1207107e−006 | −4.3138605e−008 | 0 | 0 |
| 5 | 0 | 0.00074730923 | −0.00014466811 | 1.3549939e−005 | 0 | 0 |
| 6 | 0 | −0.010745429 | −0.00090172597 | 0.0001357695 | −6.2815215e−006 | 0 |
| 7 | 0 | −0.020410646 | −0.0051604767 | −0.00057934828 | 0 | 0 |
| 8 | 0 | −0.050185839 | 0.012328352 | 0.0041569011 | 0 | 0 |
| ... | | | | | | |
| 12 | 0 | 0.050185839 | −0.012328352 | −0.0041569011 | 0 | 0 |
| 13 | 0 | 0.020410646 | 0.0051604767 | 0.00057934828 | 0 | 0 |
| 14 | 0 | 0.010745429 | 0.00090172597 | −0.0001357695 | 6.2815215e−006 | |
| 15 | 0 | −0.00074730923 | 0.00014466811 | −1.3549939e−005 | 0 | 0 |
| 16 | 0 | −1.561566e−006 | −3.1207107e−006 | 4.3138605e−008 | 0 | 0 |
| 17 | 0 | 0.001185155 | 3.8186753e−005 | −9.7252063e−007 | 4.5853774e−008 | |

In the above Tables 2 and 4, the first column (Surf) indicates the number of the surface considered for the optimization. #0 (OBJ) is the object surface, #27 (IMA) and #18 (IMA) are the image surfaces for Table 2 and Table 3, respectively. (STO) indicates a STOP surface. The second column indicates the type of the surface, namely Standard (spherical or plane), Aspherical or Coordinate Break. The third column contains the radius of curvature of the given surface. Indicated in column 4 is the thickness (distance) in mm between the two surfaces of lines (n) and (n+1). The 5th column contains the name of the material of the lenses. The diameter in mm of the surface under consideration is given in column 6. Of course, this diameter represents only the minimum necessary diameter. Finally, the 7th column shows the conical constants of the aspherical surfaces.

What is claimed is:

1. A reflection-type holographic storage system with a coaxial common aperture arrangement of an object beam and a reference beam, in which the object beam and the reference beam are illuminated into a holographic storage medium by the same lenses, the object beam and the reference beam having a first wavelength, wherein the reflection-type holographic storage system comprises:
    a first light source for generating the object beam and the reference beam;
    a second light source for generating a servo beam having a second wavelength different from the first wavelength;
    an information channel;
    a reference channel;
    a dedicated servo channel, wherein the information channel is a finite conjugate system and the reference channel and the dedicated servo channel are infinite conjugate systems; and
    a lens system with a Fourier plane that coincides with a hologram layer of the holographic storage medium;
    wherein the lens system is configured to:
        Fourier transform the object beam into the hologram layer of the holographic storage medium;
        focus the reference beam into the hologram layer of the holographic storage medium; and
        focus the servo beam onto a servo area of the hologram layer;
    and wherein the lens system comprises:
        a moving part comprising three lenses, which is configured to Fourier transform the object beam into the hologram layer of the holographic storage medium and to focus the reference beam and the servo beam into the hologram layer of the holographic storage medium; and
        a fixed part, which is configured to pre-focus only the servo beam.

2. The reflection-type holographic storage system according to claim 1, wherein two of the three lenses of the moving part are aspheres and one lens is a spherical lens.

3. The reflection-type holographic storage system according to claim 1, wherein the three lenses of the moving part are aspheres.

4. The reflection-type holographic storage system according to claim 1, wherein the fixed part is a focusing lens.

5. The reflection-type holographic storage system according to claim 1, further comprising a wavelength selective beam splitter for coupling the servo beam into the beam path of the object beam or the reference beam.

6. The reflection-type holographic storage system according to claim 1, wherein the holographic storage system is a 4f system and the hologram layer of the holographic storage medium is located in a Fourier plane of the 4f system.

7. The reflection-type holographic storage system according to claim 1, wherein the lens system is optimized simultaneously for the information channel, the reference channel, and the servo channel of the 4f system in such way that the wavefront quality of the three channels is equal or better than 0.02 RMSλ.

8. The reflection-type holographic storage system according to claim 1, wherein the information channel is in telecentric/inverse telecentric mode for the object plane and the image plane of the 4f system.

* * * * *